United States Patent
Cichon, Jr.

(10) Patent No.: US 9,441,701 B2
(45) Date of Patent: Sep. 13, 2016

(54) DAMPERS FOR CLUTCH LINKAGES

(71) Applicant: Samuel E. Cichon, Jr., Fishkill, NY (US)

(72) Inventor: Samuel E. Cichon, Jr., Fishkill, NY (US)

( * ) Notice: Subject to any disclaimer, the term of this patent is extended or adjusted under 35 U.S.C. 154(b) by 705 days.

(21) Appl. No.: 13/656,687

(22) Filed: Oct. 20, 2012

(65) Prior Publication Data

US 2014/0110217 A1  Apr. 24, 2014

(51) Int. Cl.
- *F16D 23/12* (2006.01)
- *F16F 9/53* (2006.01)
- *B60K 23/02* (2006.01)

(52) U.S. Cl.
CPC ............. *F16F 9/535* (2013.01); *B60K 23/02* (2013.01)

(58) Field of Classification Search
CPC ........... F16D 2025/081; F16D 25/087; F16D 2048/0215; F16D 2048/023; F16D 23/12
See application file for complete search history.

(56) References Cited

U.S. PATENT DOCUMENTS

| | | |
|---|---|---|
| 4,154,119 A | 5/1979 | Chapman |
| 4,505,368 A | 3/1985 | Ackermann |
| 4,621,721 A | 11/1986 | Czerwick |
| 4,998,609 A * | 3/1991 | Nix et al. ............... 192/109 F |
| 5,277,281 A | 1/1994 | Carlson |
| 5,435,797 A | 7/1995 | Harris |
| 7,963,884 B2 | 6/2011 | Hiroi |
| 8,096,921 B2 | 1/2012 | Hahn |
| 2012/0186934 A1* | 7/2012 | Ota et al. ............... 192/85.63 |

* cited by examiner

*Primary Examiner* — Huan Le
(74) *Attorney, Agent, or Firm* — Graham S. Jones, II

(57) ABSTRACT

A motor vehicle includes a clutch linkage connected to a throw out lever which is operated by a clutch pedal or said control lever biased by a return spring to a clutch engaged position. A damper with a cylinder housing a piston and a piston rod delays excessively rapid engagement of the clutch by engaging the clutch linkage to provide a force opposed to pressure from the return spring. The damper functions to prevent mechanical damage to the motor vehicle and to avoid discomfort to passengers.

20 Claims, 6 Drawing Sheets

DAMPERS FOR CLUTCH LINKAGES

BACKGROUND OF THE INVENTION

This invention relates to motor vehicle clutches and more particularly to mechanical or hydraulic clutch actuating linkages for engaging and disengaging a clutch of a motor vehicle.

In the past some inexperienced or poorly coordinated operators of manual transmissions of motor vehicles have experienced problems when removing foot pressure from the clutch pedal or when releasing manual pressure from the handle on a handle bar too quickly or too slowly causing unwanted jerking of the motor vehicle or causing damage to the clutch. In particular, excessively rapid engagement of a clutch in a motor vehicle can shock the drive train of the motor vehicle. By preventing drive train shock, satisfactory balance of the vehicle and handling characteristics are enhanced. It is well known that clutch engagement needs to occur at a certain rate to be efficient. Engaging a clutch too quickly can damage the drive train components of the motor vehicle including the transmission, differential, half shafts, axles, and CV joints. Engaging the drive train too slowly can damage the clutch friction disc by causing clutch slippage.

Heretofore to achieve such a result a number of complicated designs have been employed.

An object of this invention is to ameliorate or eliminate problems of jerking of the vehicle caused by operation of the clutch by an inexperienced or physically challenged operator with a minimal complication and with few additional parts.

BRIEF DESCRIPTION OF THE DRAWINGS

FIG. 5A is a modification of FIG. 4 comprising a mechanical clutch system for a motorcycle type of vehicle incorporating dampers for retarding the return of the clutch to the fully engaged position.

FIG. 9A shows the slow return damper with the piston rod in its normally extended position awaiting compression thereof by deactivation of the clutch pedal to drive the piston rod and the piston into the retracted position shown in FIG. 9B.

FIG. 9B shows the slow return damper with the piston rod and the damper piston in the fully shaft retracted position and with the damper spring fully compressed under external pressure previously exerted upon the piston rod.

DETAILED DESCRIPTION OF THE PREFERRED EMBODIMENTS

Figure 1:
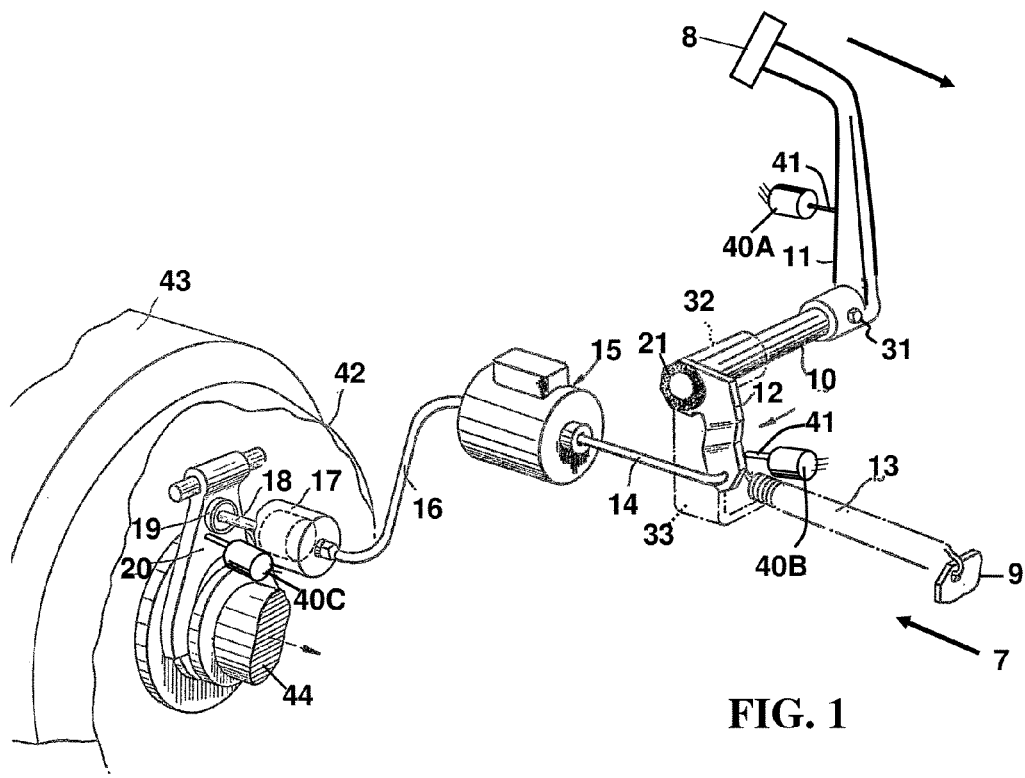
FIG. 1 is a partially schematic diagram showing a clutch pedal operated hydraulic clutch system in accordance with this invention for a motor vehicle incorporating dampers for retarding the return of the clutch to the fully engaged position.

FIG. 1 is a partially schematic diagram of an embodiment of the present invention showing a hydraulic clutch system for a motor vehicle incorporating dampers for retarding the return of the clutch to the fully engaged position. In FIG. 1, the hydraulic clutch system 7 includes a clutch housing 42, a transmission 43 and a drive shaft 44 from the engine to the clutch (not shown) which is located within the clutch housing 42. The hydraulic clutch system 7 has been modified in accordance with the present invention to overcome the problem of jerking of the vehicle during rapid clutch engagement in a low gear by incorporation of dampers 40A-40C for the purpose of retarding the return of the clutch to the fully engaged position. The hydraulic clutch system 7 has been converted to operate with smooth clutch engagement by installation in accordance with the present invention of one or more hydraulic or spring operated dampers 40A, 40B and 40C with each having a piston rod 41 to ameliorate or eliminate problems of jerking of the vehicle caused by operation of the clutch by an inexperienced or physically challenged operator starting out from an at rest or stopped condition. Only one damper may be needed to perform with the improved operation of a hydraulic clutch system provided by the present invention.

However to show alternative locations for a damper, the hydraulic clutch system 7 of FIG. 1 shows two dampers 40A and 40B with shafts 41 located pressing upon parts of the system 7 before the master cylinder 15, the hydraulic fluid tube 16, the hydraulic slave cylinder 17 and the slave cylinder piston drive rod 18. of the hydraulic actuating linkage of the clutch system 7 or one damper 40C located after the slave cylinder piston drive rod 18 to ameliorate or eliminate problems of jerking of the vehicle caused by clutch operation by an inexperienced or physically challenged operator starting out from an at rest or stopped condition.

The pre-existing clutch system of FIG. 1 includes a clutch pedal 8 mounted on the proximal end of a pedal arm 11 which is mounted extending radially from the distal end of a rotatable cross shaft 10 so that when the clutch pedal 8 a vehicle operator depresses pedal 8, in the direction indicated by the arrow above the clutch pedal 8, the rotatable cross shaft 10 turns clockwise. A metal bearing 32 (shown in phantom) is provided to support the cross shaft 10 for rotation. The metal bearing 32 is integral with a support 33 (also shown in phantom) which is secured to the frame of the motor vehicle, as will be understood by those skilled in the art. A first weld 21 bonds the proximal end of the rotatable cross shaft 10 to a downwardly depending pedal return lever 12 (depending downwardly from the cross shaft 10.) The pedal return lever 12 is secured to the proximal end of a return spring 13 that returns the clutch pedal 8 to its normally disengaged position. To perform that function, the return spring 13 is secured at its distal end to a mounting bracket 9 secured to the body of the motor vehicle. The pedal return lever 12 supports an actuating rod 14 that is comparatively short which, when pedal 8 is depressed, drives a piston (not shown) into the master cylinder 15 the hydraulic clutch system 7. The hydraulic fluid tube 16 from a hydraulic master cylinder 15 in turn energizes a smaller hydraulic slave cylinder 17. When the slave cylinder 17 is energized a master cylinder piston therein (not shown) extends a slave cylinder piston rod 18 which is outwardly projecting with its free end seated in a cup-like abutment 19 formed on a clutch disengaging lever referred to hereinafter as a throw-out fork 20 of a clutch system in the clutch housing 44. When the piston rod 18 is extended, it presses upon the throw-out fork 20 thereby disengaging the clutch in the clutch housing 42.

In accordance with this embodiment of the present invention, the three dampers 40A-40C shown in FIG. 1 are provided for slowing reengagement of the clutch to ameliorate or eliminate problems of jerking of the vehicle caused by operation of the clutch by an inexperienced or physically challenged operator starting out from an at rest or stopped condition. A first damper 40A is installed behind pedal arm 11. A piston rod 41 actuated by the first damper 40A pushes against the pedal arm 11 in the direction indicated by the arrow above the pedal 8 to slow down the return of the pedal 8 to its initial position prior to actuation, as shown in FIG. 1, thereby slowing down reengagement of the clutch. The piston rod 41 of the first damper 40A pushes in the same direction as the arrow next to the pedal 8 which is opposite direction from the force exerted by the return spring 13, to retard the return of the pedal 8 to its initial position, slowing clutch engagement. The piston rod 41 of a second damper 40B pushes the pedal return lever 12 clockwise against the force exerted by the return spring 13 and the shaft of a throw-out fork damper 40C presses against the throw-out fork 20, both working to slow clutch reengagement. It is noted that the first two dampers 40A-40B are shown located before and separate from the hydraulic parts comprised by the actuating rod 14, the hydraulic master cylinder 15, the hydraulic fluid tube 16, the hydraulic slave cylinder 17, and the slave cylinder piston drive rod 18. Also, the To summarize, the dampers 40A-40C are separate from the hydraulic linkage since damper 40A pushes on the pedal arm 11 and damper 40B pushes on the pedal return lever 12. Dampers 40A and 40B are both located before the hydraulic linkage 14-18. The throw-out fork damper 40C is located after the slave cylinder piston drive rod 18. The piston of the throw-out fork damper 40C contacts the throw out fork 20 and is located after the hydraulic linkage 14-18.

In summary, with regard to the embodiment of the invention shown in FIG. 1, when the clutch pedal 8 is depressed in the direction indicated by the arrow adjacent thereto, the clockwise rotation of the cross shaft 10 against the force of the return spring 13 causes the actuating rod 14 to actuate the hydraulic master cylinder 15 by pushing its piston into it, thereby forcing hydraulic fluid out of line 16 from the hydraulic master cylinder 15 through the hydraulic fluid tube 16 into the input of the hydraulic slave cylinder 17 causing the slave cylinder piston therein to extend its slave cylinder piston drive rod 18 therefrom so that it presses the clutch throw-out fork 20 to disengage the clutch (not shown) located in the clutch housing 42. Later, when the force on the clutch pedal 8 is removed by withdrawing the foot of the operator therefrom, the cross shaft 10 tends to return to its original position, thereby causing the actuating rod 14 to pull the piston in the master cylinder 15 towards its original position, returning hydraulic fluid from the slave cylinder 17 through hydraulic fluid tube 16 into the master cylinder 15. As the hydraulic fluid returns from the slave cylinder 17 to the master cylinder 15 the piston therein withdraws the drive rod 18 to the right. As the drive rod 18 withdraws, it relaxes the force on the throw-out fork 20. As the throw-out fork returns to its original position, a conventional clutch return spring (not shown) within the clutch housing 44 causes the clutch to re-engage. The operation of the clutch throw-out fork, and the actual structural configuration of the elements employed to achieve disengagement of the clutch are well known to those skilled in the art and has been illustrated and described here in a general fashion to facilitate an understanding of the use of the damper(s) of the present invention.

Figure 2:
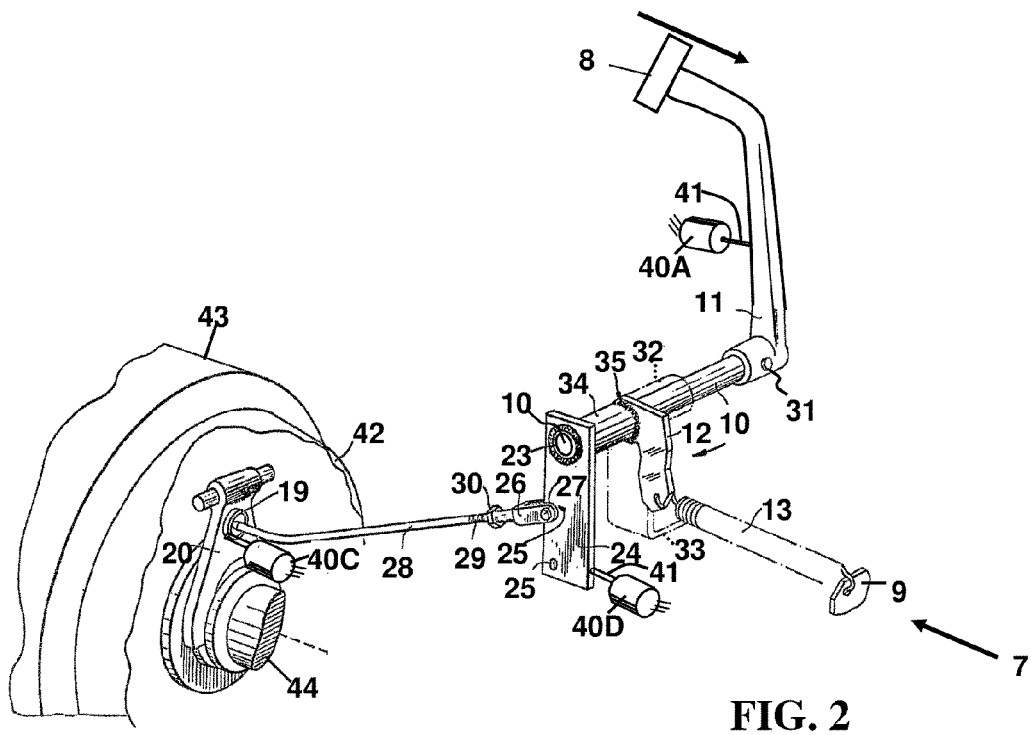
FIG. 2 is a partially schematic diagram showing a modification of FIG. 1 which is a clutch pedal operated embodiment of this invention comprising a mechanical clutch system for a motor vehicle incorporating dampers for retarding the return of the clutch to the fully engaged position.

FIG. 2 is a partially schematic diagram showing of an embodiment of the present invention which comprises a modification of FIG. 1 in the form of a clutch pedal operated mechanical clutch system for a motor vehicle incorporating dampers for retarding the return of the clutch to the fully engaged position. In FIG. 2, a metal tube 34 is inserted onto the proximal end of the cross shaft 10 which is longer than in FIG. 1 and which is secured thereto by a conventional set screw that is not visible at the angle shown in the drawing. A weld 35 secures the pedal return lever 12 to the metal tube 34 and thus to the cross shaft 10. A weld 23 secures the proximal end of the metal tube 34 to a hole in the upper end of a crank 24. The crank 24 comprises an elongated, rectangular metal plate. The weld 23 the tube 34 and the cross shaft 10 fill the hole in the crank 24. As explained above, the crank 24 and the tube 34 are fixedly secured to cross shaft 10 for rotation therewith.

The crank 24 depends downwardly from cross shaft 10 and is oriented in a plane transverse to the axis of rotation of both the cross shaft 10 and the tube 34. Pivotal attachment holes 25 through the crank 24 are spaced respectively at different distances from the common rotational axis of tube 34 and the cross shaft 10. A mechanical linkage is formed by clevis 26, clevis pin 27, an actuating rod 28, a threaded section 29, and a jam nut 30. The clevis 26 is provided with the clevis pin 27 that is shown passing through one of the attachment holes 25 and adapted to be retained in the selected hole for pivotal motion therein by means of a cotter pin (not shown) on the remote side of plate 24. An elongated actuating rod 28 includes a threaded section 29 at one end thereof for thread engagement with the clevis 26. The actuating rod 28 is adapted to be screwed a selected distance into clevis 26 to adjust the effective length of rod 28, and a jam nut 30 is provided for locking the rod 28 to clevis 26 at the selected adjusted length. Adjacent to the free end of rod 28, a comparatively short length thereof is bent through an angle to the main direction of elongation of the rod to facilitate engagement of the free end of rod 28 with abutment 19 on the throw-out fork 20. Thus it is assured that the free end of the rod 28 extends into the cup-like abutment 19 at substantially right angles to the plane of the throw-out fork 20 to disengage the clutch by pressing upon the throw-out fork 20. It is noted that in FIG. 2 three dampers 40A, 40C and 40D are shown to be located after crank 24 and separate from the mechanical elements 26-30 comprised by the clevis 26, clevis in 27, actuating rod 28, threaded section 29, and lam nut 30 or after the actuating rod 28.

In FIG. 2, in accordance with the present invention, as in FIG. 1, a first damper 40A is shown installed behind pedal arm 11 with piston rod 41 of first damper 40A pushing pedal arm 11 in the direction indicated by the arrow above the pedal 8 to slow down the return of the clutch pedal 8 to its initial position prior to actuation, as shown in FIG. 1. The pedal return lever 12 is secured to the proximal end of a return spring 13 that returns the clutch pedal 8 to its normally disengaged position. The piston rod 41 pushes in the same direction as the arrow next to the pedal 8. That is the opposite direction from the force exerted by the return spring 13, thereby retarding the return of the clutch pedal 8 to its initial position. As in FIG. 1, the shaft of a throw-out fork damper 40C presses against the throw-out fork 20. In FIG. 2, a modification comprises using a fourth damper 40D with its piston rod 41 pushing the plate 24 and the pedal return lever 12 clockwise against the force exerted by the return spring 13.

Thus return motion of clutch pedal 8 to its initial position slows as in FIG. 1. Also as in FIG. 1, piston rod 41 pushes in the same direction as the arrow next to pedal 8 which is opposite direction from the force exerted by return spring 13, thereby retarding the return of the pedal 8 to its initial position. As in FIG. 1, piston rod 41 of second damper 40B pushes pedal return lever 12 clockwise against the force exerted by return spring 13. As in FIG. 1, the shaft of the throw-out fork damper 40C presses against the throw-out fork 20.

Figure 3:
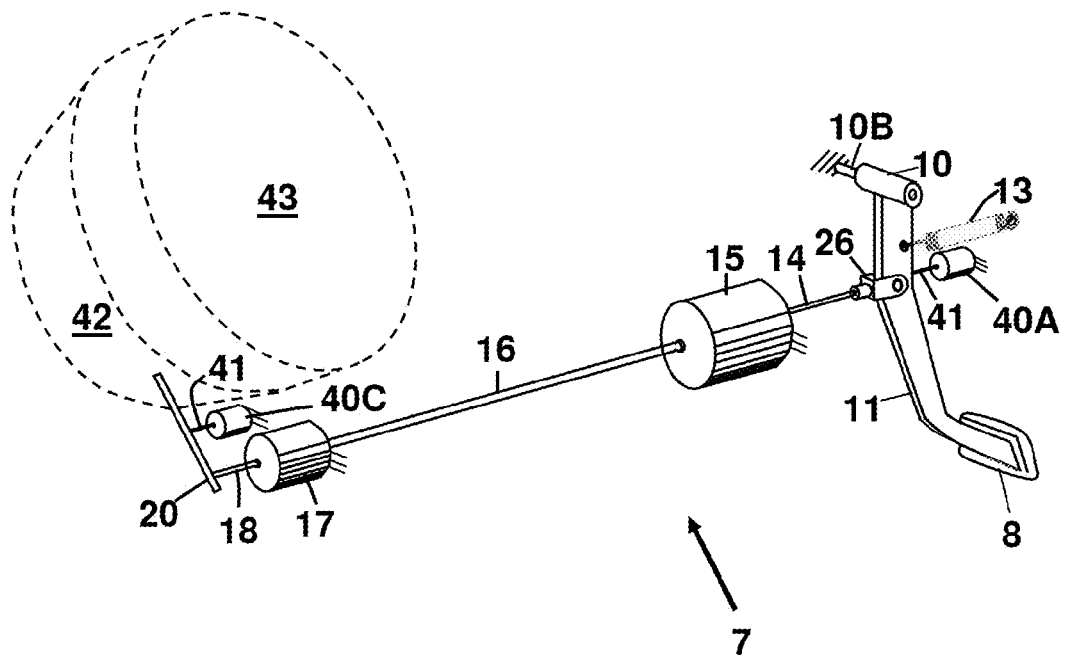
FIG. 3 is a schematic perspective drawing of a clutch pedal operated embodiment of this invention comprising a hydraulic clutch system for a motor vehicle incorporating dampers with a clutch housing and a transmission.

FIG. 3 is a schematic perspective drawing of a clutch pedal operated embodiment of this invention comprising a hydraulic clutch system 7 for a motor vehicle with a clutch housing 42 and a transmission 43. As with FIG. 1, the hydraulic clutch system 7 has been converted to operate with smooth clutch engagement by installation in accordance with the present invention by incorporation of two hydraulic or spring operated dampers 40A and 40C, each of which has a piston rod 41. As with FIG. 1, the pre-existing clutch system includes a clutch pedal 8 mounted on the proximal end of a pedal arm 11 which is mounted extending radially from the distal end of a rotatable cross shaft 10 so that when the clutch pedal 8 is depressed by the operator of the vehicle (in the direction indicated by the arrow above the clutch pedal 8,) the rotatable cross shaft 10 turns clockwise. A metal bearing 10B secured to the vehicle body supports the cross shaft 10 for rotation. The pedal arm 11 is secured to the proximal end of a return spring 13 that returns the clutch pedal 8 to its normally disengaged position. The return spring 13 is fastened at its distal end to a mounting bracket 9 is secured to the body of the motor vehicle. In FIG. 3, an actuating rod 14 is connected to pedal arm 11 by a clevis 26 so that when clutch pedal 8 is depressed, actuating rod 14 drives a piston (not shown) into the hydraulic master cylinder 15 of the clutch system, and the hydraulic fluid tube 16 from the hydraulic master cylinder 15 in turn energizes a smaller hydraulic slave cylinder 17. When the slave cylinder 17 is energized a master cylinder piston therein (not shown) drives a slave cylinder piston rod 18 which projects outwardly. Its free end presses directly on the clutch throw-out fork 20 of a clutch system in the clutch housing 44 to disengage the clutch or to reengage it as the clutch pedal 8 is released. The dampers 40A and 40C and the piston rods 41 thereof perform as described above on the pedal arm 11 and the clutch throw-out fork 20.

Figure 4:
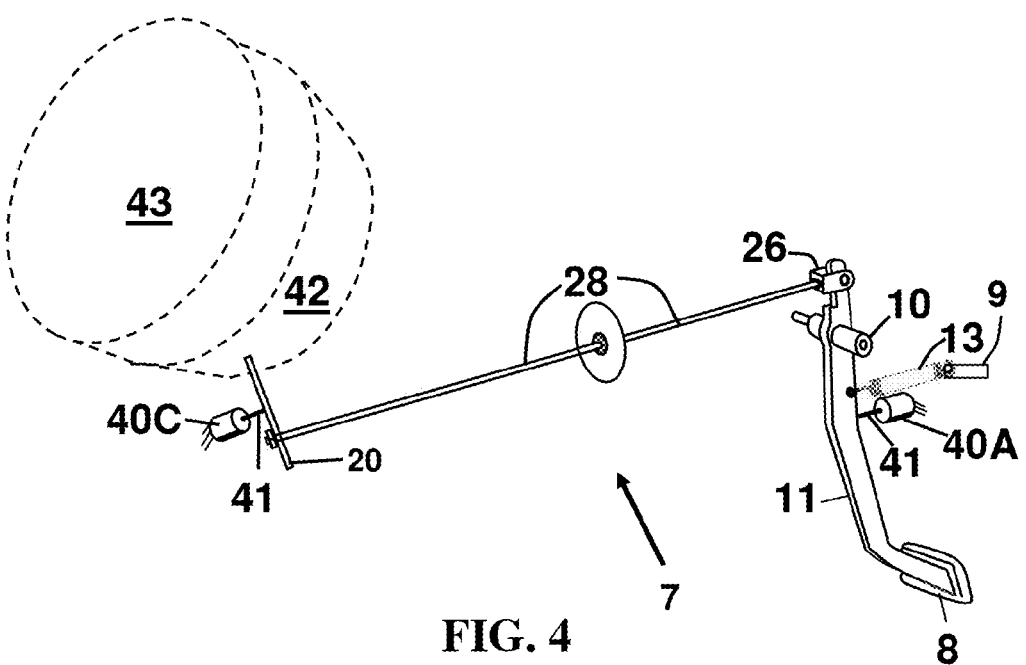
FIG. 4 is a schematic perspective drawing of a clutch pedal operated embodiment of this invention comprising a mechanical clutch system for a motor vehicle with a clutch housing and a transmission comprising a modification of FIGS. 2 and 3 also incorporating dampers with the orientation of the clutch housing and a transmission reversed for convenience of illustration.

FIG. 4 is a schematic perspective drawing of a clutch pedal operated embodiment of this invention comprising a mechanical clutch system 7 for a motor vehicle with a clutch housing 42 and a transmission 43 comprising a modification of FIGS. 2 and 3, with the orientation of the clutch housing 42 and a transmission 43 reversed for convenience of illustration. The cross shaft 10 located below the clevis 26 so that the disengagement rod 28 is pushed to actuate the throw-out fork 20 to disengage the clutch. The pedal arm 11 is secured to the proximal end of a return spring 13 that returns the clutch pedal 8 to its normally disengaged position; and the return spring 13 that is fastened at its distal end to a mounting bracket 9 is secured to the body of the motor vehicle. The dampers 40A and 40C and the piston rods 41 thereof perform as described above on the pedal arm 11 and the clutch throw-out fork 20.

Figure 5A:
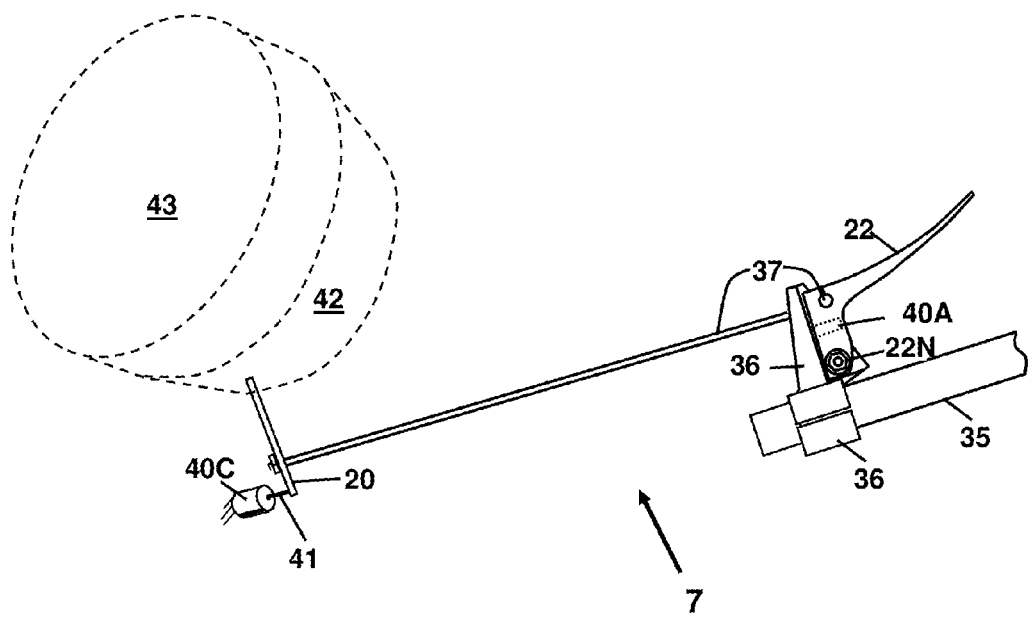
FIG. 5A is a schematic diagram showing a manually operated embodiment of this invention employing a control lever mounted by a perch on a handlebar for operation of the clutch throw-out fork of a motor vehicle.

FIG. 5A is a schematic perspective diagram showing a manually operated embodiment of this invention employing a lever mounted by a perch on a handlebar for operated which is a modification of FIG. 4 comprising a mechanical clutch system for a motorcycle type of vehicle incorporating dampers for retarding the return of the clutch to the fully engaged position. A hand-operated control lever 22 is mounted by a perch 36 on a cylindrical handlebar 35 of a vehicle (not shown) such as a motorcycle, etc. The handlebar 35 is provided with a manually operated control lever 22 with a linkage, such as a cable actuator comprising linkage 37 or a rigid mechanical linkage (not shown) operated by reciprocation or in another manner well-known to those skilled in the art when the control lever 22 is actuated. Control lever 22 is secured to the handlebar 35 by a perch 36, i.e. a handlebar mounting bracket. The perch 36 is clamped to the handlebar 35 in the conventional manner. The control lever 22 is pivotally secured to the perch 36 by a pivot axis screw/nut 22N so that the control lever 22 pivots about the pivot axis screw/nut 22N. A damper 40A is inserted into the control lever with its piston rod 41 in contact with the perch 36. The dampers 40A and 40C and the piston rods 41 thereof perform as described above on the pedal arm 11 and the clutch throw-out fork 20.

Figure 5B:
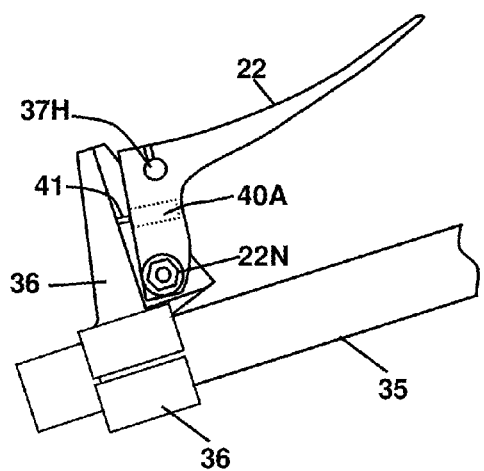
FIG. 5B is an enlarged schematic perspective drawing of a modification of FIG. 5A with the control lever rotated to expose the shaft of a damper.
Figure 5C:
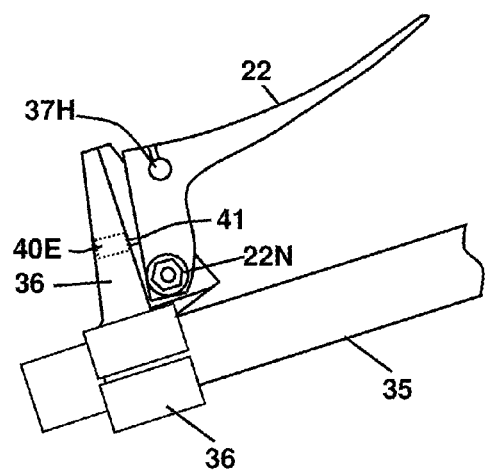
FIG. 5C is a modification of FIG. 5B with a damper in the perch in contact with the control lever.

FIG. 5B is an enlarged schematic perspective drawing of a modification of FIG. 5A with the control lever 22 rotated to expose the piston rod 41 of damper 40A. FIG. 5C is a modification of FIG. 5B with a damper 40E in the perch with the piston rod 41 of damper 40E in contact with the control lever 22.

Figure 6:
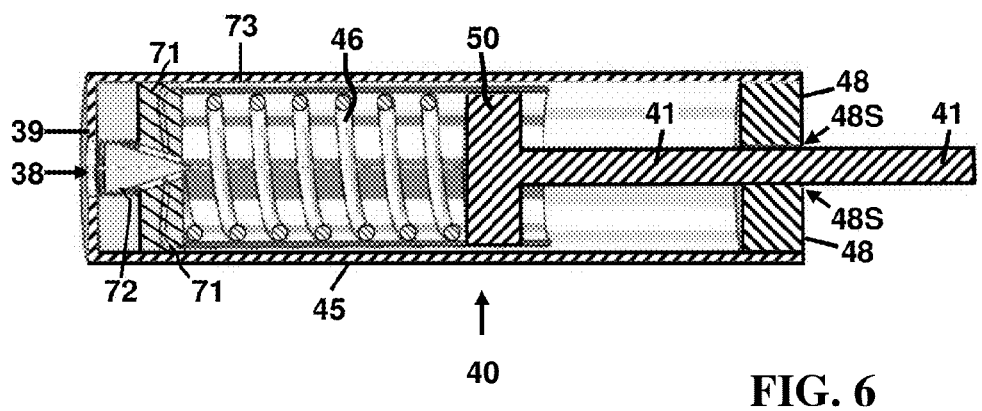
FIG. 6 is a sectional view of a spring operated damper with a hollow damper cylinder containing a piston with a piston rod on the sealed end thereof extending through a cap bearing sealed by a bearing seal at the sealed end of the damper cylinder.

FIG. 6 is a sectional view of a spring operated hydraulic damper 40 with a hollow damper cylinder 45 containing a piston 50 with a piston rod 41 on the sealed end thereof extending through a cap bearing 48 sealed by a bearing seal 48S at the sealed end of cylinder 45. The damper 40 includes a damper return coil spring 46 tending to drive the piston rod 41 out of the cylinder 45. An orifice block 71 is provided at the other end of the hollow damper cylinder 45. The orifice block 71 is adjusted by an orifice adjustment screw 72. Inside of the hollow damper cylinder 45 is a piston/spring liner 73. The liner 73 may contain grooves or holes to regulate the flow of hydraulic fluid during the compression stroke.

Figure 7A:
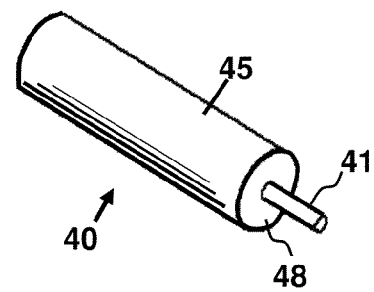
FIG. 7A is a perspective view of a spring operated damper including a damper cylinder and a piston rod extending through a cap bearing on the right end thereof.
Figure 7C:
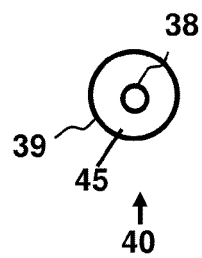
FIG. 7C is a left end view of the damper of FIG. 7A with a hole to access the needle valve adjustment screw for the (pressure or return) stroke of the damper (depending on manufacturer's design).
Figure 7B:
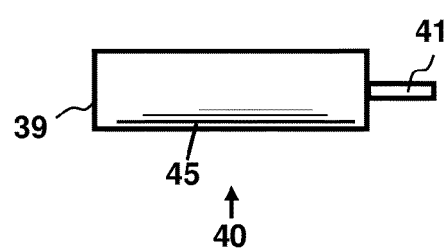
FIG. 7B is a side view of the damper of FIG. 7A with the piston rod extending from a cap bearing on the right end thereof.
Figure 7D:
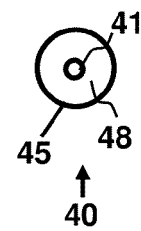
FIG. 7D is a right end view of the damper of FIG. 7A with the piston rod 41 in the center of the cap bearing on the right end.

FIG. 7A is a perspective view of a spring operated damper 40 with a damper cylinder 45, a left end 39, and a piston rod 41 extending through a cap bearing 48 on the right end. FIG. 7B is a side view of damper 40 of FIG. 7A with piston rod 41 extending from the right end of damper 40. FIG. 7C is a left end view of damper 40 with an access hole 38 in the left end 39 for access to a needle screw valve (not shown, but see FIG. 8B) for adjustment of the (pressure or return) stroke of the damper (depending on manufacturer's design). FIG. 7D is a right end view of the damper 40 of FIG. 7A with piston rod 41 in the center of cap bearing 48 on the right end.

Figure 8A:
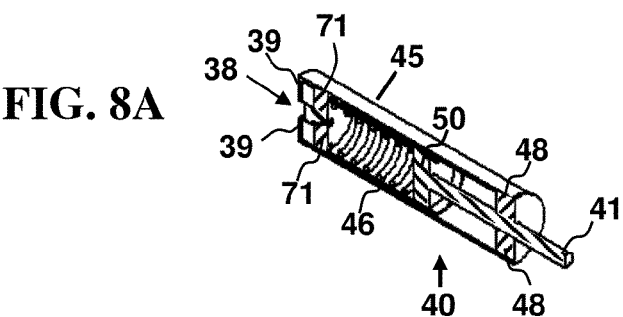
FIG. 8A is a perspective sectional view of a spring operated damper including a damper cylinder housing a damper piston from which the piston rod extends on the right through the center of a sealed cap bearing on the right end. A vent hole in the left end is formed in an orifice block.
Figure 8C:
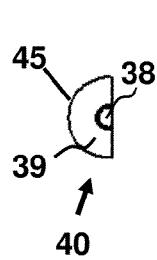
FIG. 8C is a sectional left end view of the damper of FIG. 8A.
Figure 8B:
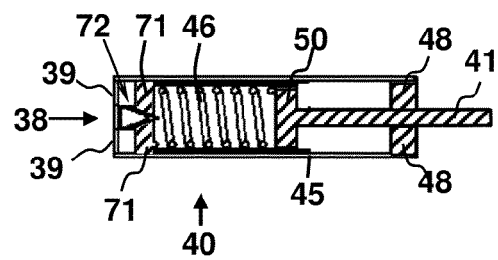
FIG. 8B is a sectional side view of the damper of FIG. 8A.
Figure 8D:
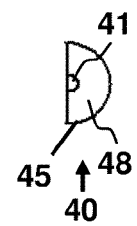
FIG. 8D is a sectional right end view of the damper of FIG. 8A.

FIG. 8A is a perspective sectional view of a spring operated damper 40 including a damper cylinder 45 housing a damper piston 50 from which the piston rod 41 extends on the right through the center of sealed cap bearing 48 on the right end. The vent hole 38 in the left end 39 is formed in an orifice block 71. FIG. 8B is a sectional side view of the damper 40 of FIG. 8A showing a needle valve adjustment screw 72. FIG. 8C is a sectional left end view of the damper 40 of FIG. 8A. FIG. 8D is a sectional right end view of the damper 40 of FIG. 8A.

Figure 9A:
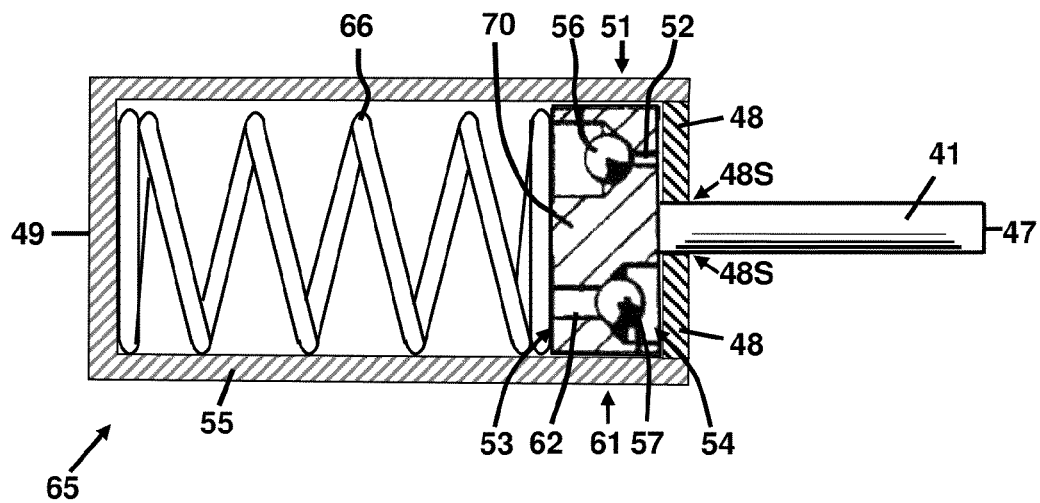
FIGS. 9A and 9B are partially sectional views of a slow compression, faster expansion hydraulic damper in accordance with this invention comprising a hydraulic cylinder which houses a damper piston with a piston rod and a return coil spring.
Figure 9B:
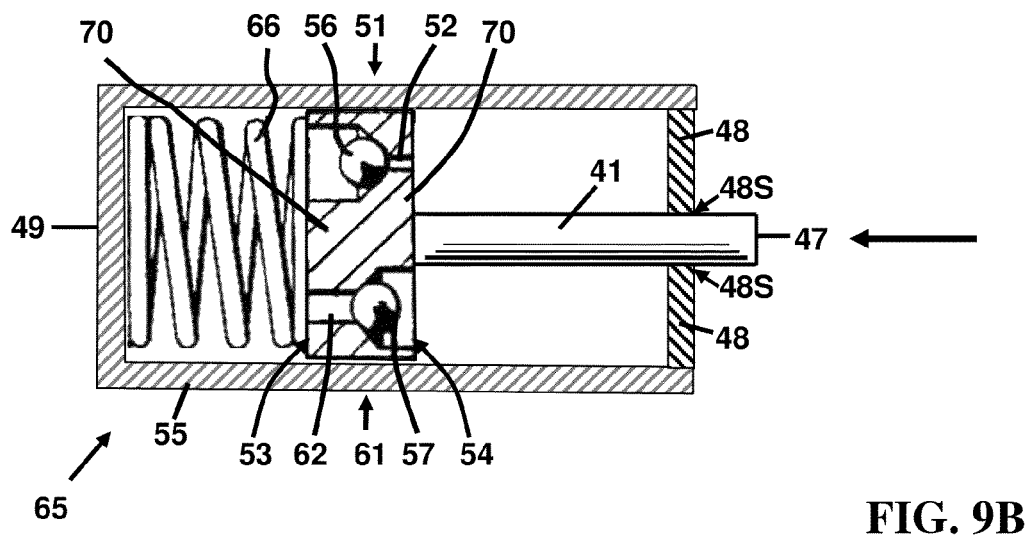

FIGS. 9A and 9B are partially sectional views of a hydraulic damper 65 in accordance with this invention. During a fast compression phase of operation, the damper 65 moves from the position shown in FIG. 9A to the position shown in FIG. 9B. During a slow expansion phase of operation, the damper 65 moves from the position shown in FIG. 9B to the position shown in FIG. 9A. The damper 65 includes a hydraulic cylinder 55 which houses a damper piston 70 with a piston rod 41 and a return coil spring 66. Coil spring 66 is shown in the expanded position in FIG. 9A and compressed in FIG. 9B. Hydraulic cylinder 55 has a closed end 49 on the left. On the right hydraulic cylinder 55 is closed by a cap bearing 48 which includes a sealed shaft hole 48S through which the piston rod 41 extends for reciprocal motion therethrough. The return coil spring 66 presses on the left against the proximal, closed end 49 of the hydraulic cylinder 55 and on the right against the left surface of piston 70. The piston rod 41 is affixed to the distal, right end of the piston 70. A feature of the damper piston 70 is that it includes two check valves 51/61 extending therethrough between the spring end 53 on the left and the shaft end 54 on the right. Those check valves 51/61 comprise a fast compression check valve 61 and a slow expansion check valve 51. The fast compression check valve 61 includes a large diameter compression orifice 62 through the piston 70 operated by a compression orifice ball 57. The slow expansion check valve 51 includes a small diameter orifice 52 operated by the expansion orifice ball 56.

Piston 70 of FIGS. 9A/9B moves within the damper cylinder 55 in the presence of hydraulic fluid contained by cylinder 55 on both sides of the piston 70. The slower flow orifice 52 of the slower flow expansion check valve 51 is somewhat smaller than faster flow orifice 62 of the faster flow compression check valve 61. Slower flow orifice 52 is designed to assure a slow rate of expansion of coil spring 66 that causes extension of piston rod 41. As a result, when clutch pedal 8 is released, piston rod 41 moves relatively slowly towards the position shown in FIG. 9A from the retracted position shown in FIG. 9B. On the other hand the faster flow compression orifice 62 is designed to provide a fast rate of retraction of the piston rod 41 when the clutch pedal 8 is depressed thereby pressing the piston rod 41 against the force of the compression spring 66 from the position shown in FIG. 9A into the position shown in FIG. 9B.

Referring to FIG. 9A, in operation of the hydraulic damper 65, when spring 48 is forced to compress under pressure applied to the piston rod 41 by depression of the clutch pedal 8, the hydraulic fluid flows rapidly through the faster flow compression check valve 61 from the left side to the right side of piston 70. On the other hand, when the coil spring 66 is enabled to expand, as the pressure on the clutch pedal 8 is removed by the operator of the motor vehicle, the hydraulic fluid flows slowly through slower expansion check valve 51 to the left side from the right side of piston 70 In other words, because the orifice 62 of the faster flow compression check valve 61 is larger than the orifice 52 of the slower flow expansion check valve 51, when foot pressure is applied to clutch pedal 8 thereby pressing the piston rod 41 to the left, the coil spring 66 contracts at a faster rate than it can expand since the hydraulic fluid is freely passing through the larger, faster flow compression orifice 62 of the fast compression check valve 61.

Referring to FIG. 9B, the slow expansion phase of operation of the damper 65 follows the fast compression phase of operation of the damper 65 as described above. During the expansion phase, the damper coil spring 66 pushes on the piston 70 which restores the damper 40 to the uncompressed state over a period of time in preparation for providing slow engagement of the clutch after the pedal 8 is released. The damper piston rod 41 pushes directly on the pedal 8 (or indirectly on the linkage thereto) thereby slowing engagement of the clutch while slowing movement of the pedal 8 towards the released position thereof. Fluid within the damper cylinder 55 on the left side of the piston 70 is driven through expansion check valve 51 while applying considerable resistance to the action of the spring and tending to counteract the forces which would otherwise rapidly restore the pedal 8 to the released position. Assuming that the damper cylinder 55 contains a medium weight hydraulic oil then both orifices 52 and 62 would have to be nearly the same size with the compression orifice 62 being larger than the expansion orifice 52 so that the recovery under low pressure is as slow or slower as the compression speed is under high pressure forcing oil from left to right through compression orifice 62.

FIG. 9A shows the slow return damper 65 with the piston rod 41 in its normally extended position awaiting withdrawal thereof by activation of the clutch pedal 8 which will drive the piston rod 41 and the piston 70 into the retracted position shown in FIG. 9B. The slow return damper 60 is shown with the piston rod 41 fully extended because the coil spring 66 has pressed the piston 70 against the cap bearing 48 and little or no force is pressing upon the distal end 47 of the damper piston rod 41. In other words, the piston 70 has been driven to the right end of the cylinder 32 by the force of the coil spring 66 so that the piston rod 41 is fully extended by the force of the coil spring 66 exerted upon the piston 70 which is also in its fully extended position. Thus piston rod 41 is fully extending the out through the cap bearing 48 of cylinder 45 in position to limit the rate of motion of an object, such as the mechanism linked to the clutch pedal 8 contacted by the distal end 47 of the piston rod 41. The damper 65 can be employed with an embodiment with a clutch pedal 8, as described in connection with FIGS. 1-4 and a hand-operated control lever 22 on a handlebar as in FIGS. 5A-5C.

FIG. 9B shows the slow return damper 65 with the piston rod 41 and the damper piston 70 in the fully shaft retracted position and with the damper spring 46 fully compressed under external pressure exerted upon the piston rod 41 in the direction of the arrow proximate to the piston rod 41 by a force such as that exerted upon a clutch pedal 8, as described in connection with FIGS. 1-4 and a hand-operated control lever 22 on a handlebar as in FIGS. 5A-5C.

Figure 10A:
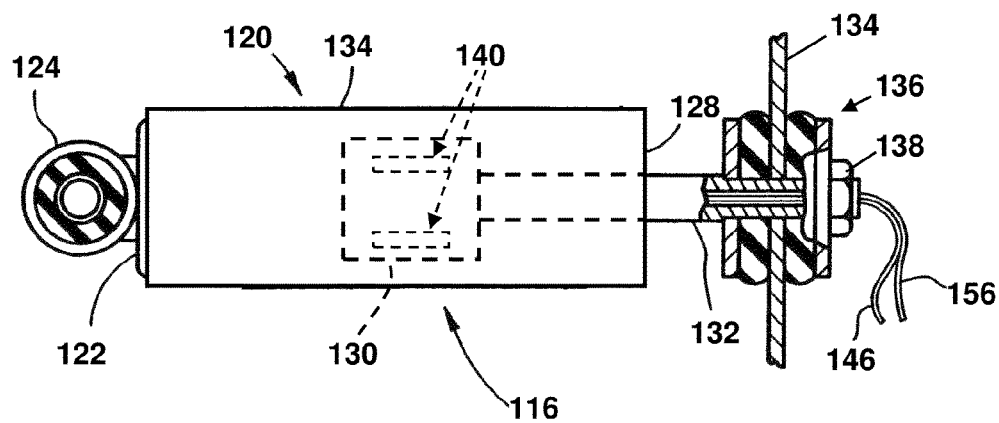
FIG. 10A is a schematic drawing of a MagnetoRheological (MR) damper for use with a clutch actuating linkage.

FIG. 10A is a schematic drawing of MagnetoRheological (MR) damper 116 which comprises a cylindrical housing 120 and a piston 130 with an attached hollow piston rod 132. Housing 120 contains MR fluid 118. The proximal end 122 of cylindrical housing 120 is closed, and it has an attachment eye 124 secured to proximal end 122. At the distal end of cylindrical housing 120 a seal 128 retains MR fluid in the cylindrical housing 120. The seal 128 has an opening for reciprocation of the piston shaft 132 therethrough. The piston rod 132 is secured to the wall 134 of the motor vehicle by mounting elements and a threaded nut 138 screwed onto the distal end of the piston shaft 132. Wires 146 and 156 are connected through the distal end of the piston rod 132 to the piston 130 to energize an electromagnet 140 formed on the piston 130. The electromagnet 140 is energized to raise the viscosity of the MR fluid, as will be well understood by those skilled in the MR damper art, to slow the movement of the piston 130 in the cylindrical housing 120 when the circuit 142 in FIG. 10B has been in the ON condition for a predetermined time delay of about two seconds.

Figure 10B:
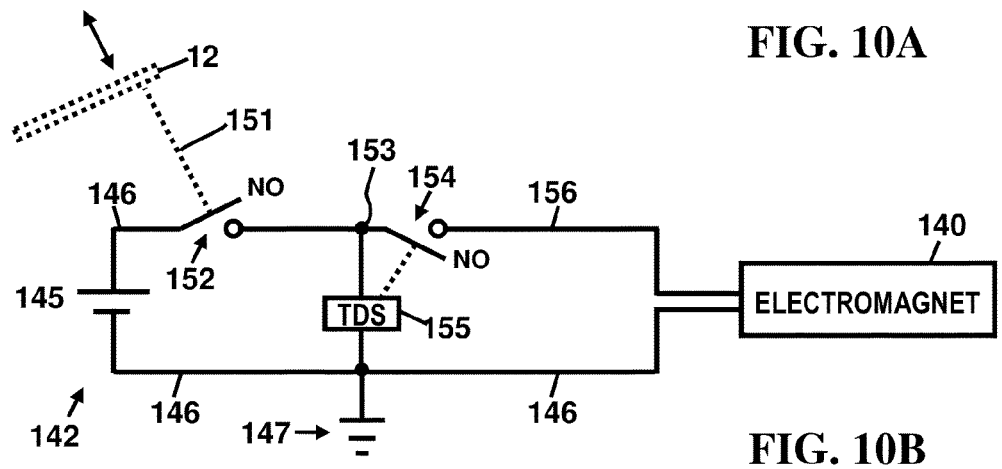
FIG. 10B is a schematic drawing of an electrical wiring circuit for increasing the viscosity of the MR fluid in the cylindrical housing in FIG. 10A by closing a normally open switch after a predetermined time delay.

FIG. 10B is a schematic electrical wiring diagram of a circuit 142 for increasing the viscosity of the MR fluid in the cylindrical housing 120 in FIG. 10A by closing a Normally Open (NO) switch 152 with a button 151 when the clutch is disengaged turning ON the output of circuit 142 to the electromagnet 140. The negative terminal of a DC voltage source 145 connects to electrical conductor 146 and to ground 147. Electrical conductor 146 is one of the lead lines to a terminal of the electromagnet 140 in the cylindrical housing 120. The positive terminal of the DC voltage source 145 is connects by line 146 to on terminal of NO switch 152 which is adapted to be energized manually by operating button 151. When NO switch 152 is closed, it connects voltage to node 153. Node 153 connects both to one terminal of NO switch 154 and one terminal of time delay relay (TDS) 155. TDS 155 is connected at its other terminal to ground. TDS 155 closes NO switch 154 after the predetermined time delay of about two seconds to energize the electromagnet 140 by current passing through line 156 to the other terminal of the electromagnet 140. When electromagnet 140 is energized it increases the viscosity of the MR fluid in the cylindrical housing 120 to slow engagement of the clutch when the pedal 8 or the control lever 22 is released by the operator of the motor vehicle. The circuit of FIG. 10B enables the MR damper 116 after the time delay provided by the time delay switch actuator TDS1 155 and later disables the MR damper 116 after the vehicle is in motion.

In summary, referring to FIG. 10B, when the time delay switch 151 is closed turning the circuit 142 ON, (with pedal/lever IN) the time delay relay TDS 155waits for a predetermined time before closing switch 154 to power the electromagnet 140. The activated electromagnet 140 thickens the fluid in the MR damper 116 and slows the engagement of the clutch. When the linkage reaches it's "rest" position (OUT/engaged), the switches 151 and 154 both open, allowing the system to function again without delay until switches 151 and 154 are both closed once more. The time delay of the relay TDS 155 prevents the damper 116 from working during normal operation because it does not turn on the damper 116 unless the pedal or lever is disengaged for a longer time period than it takes to perform a normal shift. All embodiments of dampers 40 described above should be retarded. The pistons 50/70 in the dampers 40/65 move be retarded at a "slow in" rate when the clutch engages under the high pressure force of the clutch drive train return mechanism (pressure plate). Similarly motion of the pistons 50/70 in the dampers 40/65 is retarded in the low pressure state when the piston is under the influence of the internal return springs 46/66 in the dampers 40/65. This is done with the proper sized valving (during extension) and/or channels in the piston sleeve (during compression). The MR type of damper 116 of FIG. 10A operates with a fixed delay controlled by the TDS relay 155, as described above.

The "slow out" damper movement is a principal feature of the present invention. After the vehicle is in motion, the damper does not have time to recover to the extended position and will not work. The advantage of this invention is that the device will not work to delay clutch reengagement in any normal driving situation other than starting out from a standing position.

Therefore, all models except MR should be "slow in" as the clutch engages under the high pressure force of the clutch drive train return mechanism (pressure plate), and "slow out" in it's low pressure state as the piston is under the influence of it's internal return spring. This can be done with the proper sized valving (during extension) and/or channels in the piston sleeve (during compression).

The "slow out" is the part that makes this invention useful. After the vehicle is in motion, the damper does not have time to recover to the extended position and will not work. The beauty of this device is that it will not work in any normal driving situation other than starting out.

The foregoing description discloses only exemplary embodiments of the invention. Modifications of the above disclosed apparatus and methods which fall within the scope of the invention will be readily apparent to those of ordinary skill in the art. While this invention is described in terms of the above specific exemplary embodiment(s), those skilled in the art will recognize that the invention can be practiced with modifications within the spirit and scope of the appended claims, i.e. changes can be made in form and detail, without departing from the spirit and scope of the invention. Accordingly, while the present invention is disclosed in connection with exemplary embodiments thereof, it should be understood that changes can be made to provide other embodiments which may fall within the spirit and scope of the invention and all such changes come within the purview of the present invention and the invention encompasses the subject matter defined by the following claims.

What is claimed is:

1. In an apparatus including a motor vehicle with an engine, a transmission, and a mechanical clutch linkage or a hydraulic clutch linkage interposed between the engine and the transmission with said mechanical clutch linkage or said hydraulic clutch linkage being located between an operator-controlled clutch pedal or manual control lever and a clutch; including:
    said mechanical clutch linkage or said hydraulic clutch linkage being biased by pressure from a return spring to a normal clutch engaged position and being movable between said normal clutch engaged position and a clutch disengaged position;
    a clutch disengaging lever or throw-out fork connected to be operated by said mechanical clutch linkage or hydraulic parts of said hydraulic clutch linkage;
    said clutch pedal or said control lever being connected by an actuator to said mechanical clutch linkage or said hydraulic clutch linkage to move said clutch disengaging lever or throw-out fork to said clutch disengaged position;
    said return spring providing said pressure on said mechanical clutch linkage or said hydraulic clutch linkage towards said normal clutch engaged position of said disengaging lever or said throw-out fork; and
    a damper with a cylinder which houses a piston which has a piston rod extending from one end of said cylinder, with said piston rod engaging with said mechanical clutch linkage or with said hydraulic clutch linkage between said clutch pedal or manual control lever and said actuator or engaging with said disengaging lever or said throw out fork by providing a force opposed to said pressure of said return spring;
    whereby return of the clutch to the fully engaged position is retarded thereby avoiding unwanted jerking of the motor vehicle or damage to the clutch.

2. The damper for said clutch linkage in accordance with claim 1 wherein said damper provides slow recovery during disengagement of a clutch operation.

3. The damper for said clutch linkage in accordance with claim 1 wherein said damper includes an orifice adjustment screw at one end thereof.

4. The damper for said clutch linkage in accordance with claim 1 wherein:
    said cylinder includes said first end and a second end;
    said cylinder houses said piston;
    said piston rod extends through a seal at said first end and a return spring is located between said second end of said cylinder and said piston; and
    said piston rod extends through said seal at said first end.

5. The apparatus in accordance with claim 1 wherein said piston rod is in contact with said throw out fork.

6. The apparatus in accordance with claim 1 wherein said piston rod is in contact with said operator-controlled clutch pedal or manual control lever.

7. The damper for said clutch linkage in accordance with claim 1 wherein said piston includes ball valves having orifices with different diameters for slow and less slow movement in said cylinder of hydraulic fluid through said piston.

8. The damper for said clutch linkage in accordance with claim 1 wherein said cylinder includes said first end and a second end;
    said cylinder houses said piston and an electromagnet associated with said piston; a MagnetoRheological (MR) hydraulic fluid contained in said cylinder; said piston rod extends through a seal at said first end; and an electrical circuit including a power supply and a normally open switch closable to supply power to said electromagnet prior to reengagement of said clutch.

9. The damper for said clutch linkage in accordance with claim 8 wherein said piston rod is in contact with said throw out fork.

10. The damper for said clutch linkage in accordance with claim 1 wherein: said cylinder is a hollow damper cylinder, and an orifice block is provided at an end of said hollow damper cylinder.

11. The damper for said clutch linkage in accordance with claim 10 wherein said orifice block is adjustable by an orifice adjustment screw.

12. The damper for said clutch linkage in accordance with claim 10 wherein a piston/spring liner is housed inside of said hollow damper cylinder.

13. The damper for said clutch linkage in accordance with claim 12 wherein said piston/spring liner contains grooves and/or holes to regulate the flow of hydraulic fluid during a compression stroke.

14. The damper for said clutch linkage in accordance with claim 13 wherein said piston rod is in contact with said throw out fork.

15. The damper for said clutch linkage in accordance with claim 13 wherein said piston rod is in contact with said operator-controlled clutch pedal or manual control lever.

16. The damper for said clutch linkage in accordance with claim 13 wherein said piston includes ball valves having orifices with different diameters for slow and less slow movement in said cylinder of hydraulic fluid through said piston.

17. A method of operating a motor vehicle with an engine, a transmission, with a mechanical clutch linkage or hydraulic clutch linkage interposed between the engine and the transmission,
    with said mechanical clutch linkage or said hydraulic clutch linkage operated by an operator-controlled clutch pedal or manual control lever;
    said mechanical clutch linkage or hydraulic clutch linkage being biased by pressure from a return spring to a normal clutch engaged position and being movable between said normal clutch engaged position and a clutch disengaged position;
    a clutch disengaging lever or throw-out fork connected to be operated by said mechanical clutch linkage or said hydraulic clutch linkage;
    said clutch pedal or said control lever connected by an actuator to said mechanical clutch linkage or said hydraulic clutch linkage to move said clutch disengaging lever or throw-out fork to said clutch disengaged position; and said return spring providing said pressure on said mechanical or hydraulic clutch linkage towards said normal clutch engaged position of said disengaging lever or said throw-out fork; comprising the step as follows:
    providing a damper with a cylinder which houses a piston which has a piston rod extending from one end of said cylinder, with said piston rod engaging said mechanical clutch linkage or said hydraulic clutch linkage between said clutch pedal or manual control lever and said actuator or engaging with said disengaging lever or said throw-out fork by providing a force opposed to said pressure of said return spring;
    whereby return of said clutch to a fully engaged position is retarded, thereby avoiding unwanted jerk of the motor vehicle or damage to the clutch.

18. The method of claim 17 wherein said damper retards recovery during disengagement of a clutch operation.

19. The method of claim 17 wherein said damper includes an orifice adjustment screw at one end thereof.

20. The damper method of claim 17 wherein said cylinder includes said first end and a second end,
  said cylinder houses said piston;
  said piston rod extends through a seal at said first end and a return spring is located between said second end of said cylinder and said piston; and
  said piston rod extends through said seal at said first end.

* * * * *